United States Patent [19]

Logan

[11] 4,091,063
[45] May 23, 1978

[54] HOSE CONSTRUCTION AND METHOD OF MAKING SAME

[75] Inventor: Arthur D. Logan, Waynesville, N.C.

[73] Assignee: Dayco Corporation, Dayton, Ohio

[21] Appl. No.: 557,730

[22] Filed: Mar. 12, 1975

Related U.S. Application Data

[62] Division of Ser. No. 487,510, Jul. 11, 1974, abandoned.

[51] Int. Cl.² ............................................. B29H 7/14
[52] U.S. Cl. .................................... 264/94; 156/144;
156/149; 264/103; 264/273; 264/336; 264/347;
264/DIG. 52
[58] Field of Search ................ 264/94, 173, 174, 103,
264/209, 95, 347, 336, DIG. 52, 273, 271;
156/149, 143, 144, 245; 138/173

[56] References Cited

U.S. PATENT DOCUMENTS

| | | | |
|---|---|---|---|
| 2,122,335 | 6/1938 | Berman et al. | 264/94 |
| 2,897,840 | 8/1959 | Roberts et al. | 264/94 |
| 2,936,812 | 5/1960 | Roberts | 264/94 |
| 2,974,713 | 3/1961 | Hydrick | 156/149 |
| 2,986,169 | 5/1961 | McCormick | 138/173 |
| 3,028,276 | 4/1962 | Roberts et al. | 156/144 |
| 3,038,523 | 6/1962 | Merck et al. | 156/149 |
| 3,040,383 | 6/1962 | Nassimbene | 264/94 |
| 3,076,737 | 2/1963 | Roberts | 264/94 |
| 3,084,086 | 4/1963 | Roberts et al. | 264/94 |
| 3,187,070 | 6/1965 | Marra | 264/103 |
| 3,194,705 | 7/1965 | Caplan | 264/94 |
| 3,222,728 | 12/1965 | Roberts et al. | 264/94 |
| 3,370,115 | 2/1968 | Wood | 264/94 |
| 3,399,094 | 8/1968 | Skoggard et al. | 264/94 |
| 3,586,558 | 6/1971 | Galloway et al. | 156/149 |

OTHER PUBLICATIONS

Gove et al., Webster's Third New International Dictionary, Merriam, Springfield, Mass. (1963) p. 2247 relied on.

Primary Examiner—Willard E. Hoag
Attorney, Agent, or Firm—Reuben Wolk

[57] ABSTRACT

A molded hose construction and method of making same is provided wherein such hose construction has axially spaced convolutions and a controlled flexibility defined by alternating crests and troughs, and the hose construction has an elastomeric inner layer, an elastomeric outer layer, and an intermediate reinforcing layer made of a fabric material having a substantial open space between cooperating threads defining the fabric material; and the layers are bonded as a unitary structure by strike-through columns of elastomeric material extending through said substantial space with the alternating crests and troughs having a controlled wall thickness throughout which assures the controlled flexibility, and the crests and troughs having been formed with the elastomeric layers in a semi-cured condition to assure said controlled wall thickness thereof.

6 Claims, 4 Drawing Figures

HOSE CONSTRUCTION AND METHOD OF MAKING SAME

This is a division of application Ser. No. 487,510, filed July 11, 1974, now abandoned.

BACKGROUND OF THE INVENTION

The hose construction industry is a highly competitive one confronted with many problems including the basic overriding problem of producing an acceptable product at a competitive price. Therefore, what might ordinarily appear to be a minor improvement in manufacturing technique, a reduction in the amount of material required, or a change in cross-sectional configuration will often give the manufacturer utilizing same a marketing advantage. For example, many currently used convoluted hose constructions, such as radiator hose, are manufactured utilizing a comparatively large number of components which are assembled in multiple manufacturing steps and inherently such hose constructions are comparatively expensive.

SUMMARY

This invention provides an improved molded hose construction having axially spaced convolutions and method of making same which, in essence first requires semi-curing of an assembly of plain tubular components used to make the hose construction and then finally forming by resetting the semi-cured tubular components to define a quality hose construction which can be produced and sold competitively. The hose construction has axially spaced convolutions and a controlled flexibility defined by alternating crests and troughs with said hose comprising an elastomeric inner layer, an elastomeric outer layer, and an intermediate reinforcing layer made of a fabric material having a substantial open space between cooperating threads defining the fabric, said layers being bonded as a unitary structure by strike-through columns of elastomeric material extending through said substantial space with said alternating crests and troughs having a controlled wall thickness throughout which assures said controlled flexibility.

Other details, uses, and advantages of this invention will be readily apparent from the following specification, claims, and drawing.

BRIEF DESCRIPTION OF THE DRAWING

The accompanying drawing shows present preferred embodiments of this invention, in which.

DETAILED DESCRIPTION

Figure 1:
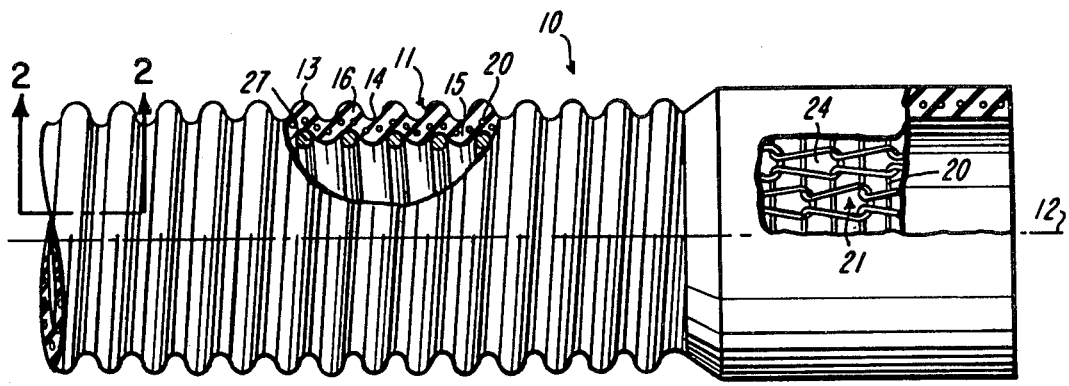
FIG. 1 is a view with parts in cross section and parts broken away illustrating one exemplary embodiment of the hose construction of this invention.
Figure 2:
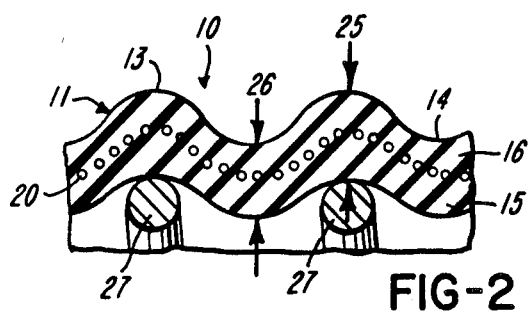
FIG. 2 is an enlarged fragmentary cross-sectional view taken essentially on the line 2—2 of FIG. 1.

Reference is now made to FIG. 1 of the drawing which illustrates one exemplary embodiment of a molded hose construction of this invention which is designated generally by the reference numeral 10 and such hose construction has axially spaced helical convolutions designated generally by the reference numeral 11 and extending along a central longitudinal axis 12 thereof. The hose construction or hose 10 has a controlled flexibility defined by alternating crests 13 and troughs 14; and, as best seen in FIG. 2 the hose 10 comprises an elastomeric inner layer 15, an elastomeric outer layer 16, and an intermediate reinforcing layer 20 made of a fabric material having a substantial total open space, as illustrated generally at 21, between cooperating threads defining the fabric. In this example, the fabric layer 20 is preferably a knitted fabric; however, it is to be understood that other similarly loose woven fabrics may be employed, if desired.

Figure 3:
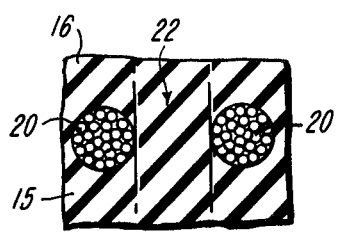
FIG. 3 is a greatly enlarged fragmentary cross-sectional view particularly illustrating inner and outer elastomeric layers of the hose construction of FIG. 1 tenaciously bonded together with a knitted reinforcing layer embedded therebetween and particularly illustrating a typical one of a plurality strike-through columns of elastomeric material defined from material of the elastomeric layers extending through the reinforcing layer.

The layers 15, 16, and 20 are bonded together as a unitary structure by strike-through columns of elastomeric material extending through the previously mentioned substantial space at 21; and, as seen in FIG. 3 a typical column which is designated by the reference numeral 22, and is delineated by dot-dash lines, extends through the space defined by a set of cooperating threads with each set of threads defining a comparatively small space 24 through which each column 22 extends.

The alternating crests 13 and troughs 14 have a controlled wall thickness throughout which assures controlled flexibility for the hose construction. In particular, the controlled wall thickness, see FIG. 2, is such that the thickness of the crests, shown at 25, is no greater than 25% thicker than the thickness of the troughs, shown at 26. Previously proposed convoluted hose constructions made using what may be considered a single curing stage and of the same general type as the hose construction 10 may often have crests generally of the order of 50% greater in thickness than the wall thickness of their troughs.

The hose 10 also has reinforcing means in the form of a reinforcing wire 27 which is arranged in a helical pattern conforming to the helical pattern of the crests of the convoluted hose and with such wire lying against the inside surface of each of such crests. The wire 27 offers maximum resistance to collapse under negative or suction pressure of the type which would be experienced on the intake side of the water pump of an automobile system which might employ the hose 10. The use of the helical wire 27 arranged inwardly of the innermost layer of a hose construction is particularly advantageous because it assures that a layer of the hose cannot collapse and prevent fluid flow through such hose. The helical wire 27 also prevents collapse of the hose when it is bent sharply through a curve with small radius.

Figure 4:
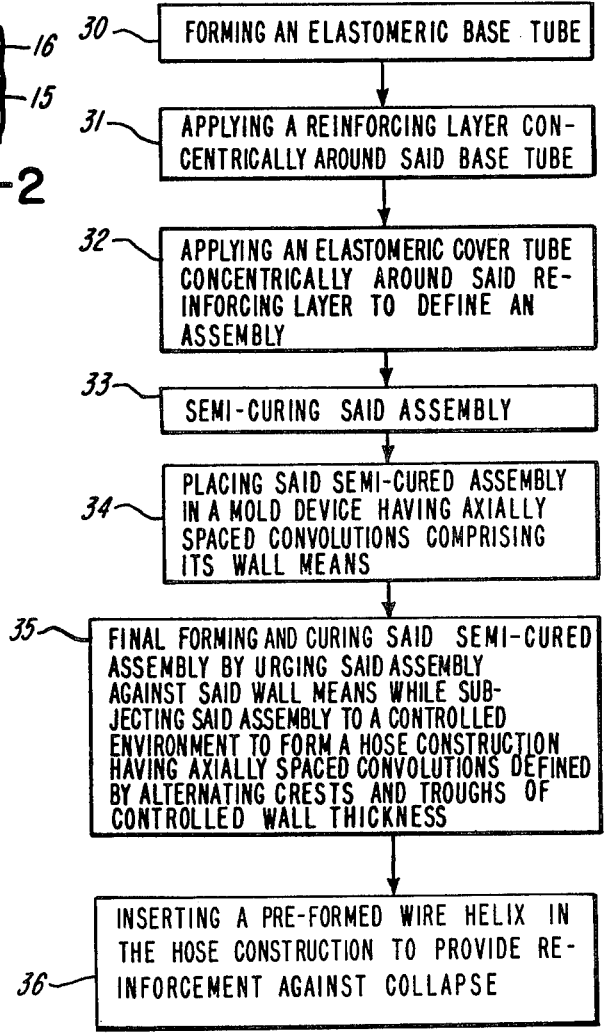
FIG. 4 is a block diagram presentation of the improved method of this invention.

Having described the improved hose construction 10 of this invention, the detailed description will now proceed with a description of the unique method of this invention which makes possible the forming of the hose construction 10 with its substantially uniform thickness and for this description reference is now made to FIG. 4 of the drawing.

In particular, a base tube is first formed of a suitable elastomeric material as indicated by the block at 30 and such tube is preferably formed by extrusion process to a specified inside diameter and gauge or wall thickness; and, the seamless extruded base tube is coiled in a continuous length which may range from several hundred feet to over a thousand feet.

The base tube is then suitably supported by inflating such tube with a suitable fluid to prevent collapse thereof whereupon a reinforcing layer is applied concentrically therearound and as indicated by the block at 31. Although any suitable compressible or non-compressible fluid may be used, ordinary shop air is preferably employed and in one application of this invention, shop air at a pressure of approximately 5 PSIG was used successfully and the reinforcing layer was applied as a knitted layer while passing the pressurized base tube through a knitting machine of well known construction and operation. Any number of layers of reinforcement may be applied; however, one layer is generally preferred.

The knit reinforced base tube is then covered with a cover tube and such cover tube is preferably applied by passing the reinforced base tube through a crosshead extruder, or the like, and extruding thereover a seamless cover tube made of a suitable elastomeric material. The cover tube is applied as indicated by the block at 32 resulting in a plain tubular assembly having cylindrical inside and outside surfaces and such assembly is further processed in a manner now to be described.

The planar tubular assembly is usually of extended length, of several hundred feet, whereupon such assembly is cut into specified lengths to define lengths of "green" or uncured hose and the actual dimension of these lengths will vary depending upon the end application. The cut lengths of uncured hose are then semi-cured in a controlled environment as indicated by the block at 33 which results in the formation of semi-cured lengths having layers 15, 16, and 20 and at this point each semi-cured hose length has a substantially cylindrical inside and outside surface.

Each semi-cured length is then placed in a mold device having a convoluted inside surface which extends in a helical pattern and corresponds to and is used to define the helically convoluted outside surface 11 whereupon a suitable fluid preferably steam under pressure is exerted against the inside surface of each semi-cured planar tubular hose length while subjecting each length to a controlled temperature for a predetermined time interval to final form and final cure each length.

The reinforcing member or wire 27 is formed or coiled in a helical pattern which corresponds to the helical pattern of the crests and this coiling may be achieved using any suitable machine such as a spring making machine of conventional construction. The helically coiled spring reinforcing member 27 is then inserted within the cured hose length using any well known technique so that it supports the inside surfaces thereof underneath the crests of the hose 10, as indicated at 36 in FIG. 4.

The forming of the hose construction 10 employing a plain tubular assembly which has first been semi-cured has unique advantages. In particular, by final forming and final curing an assembly which was first semi-cured there is no tendency for the blanks to extrude through the mold parting line in the initial part of the blow molding/curing cycle and there is no tendency for the steam injection cores to cut through the hose wall and cause steam leaks and/or scrap hose in the initial part of the blow/molding curing cycle. In addition, use of a semi-cured assembly results in better control of mold flash, and consequent elimination of need to deflash hose after molding.

It has also been found that by making the hose construction 10 in accordance with this invention, the base and cover tubes are strongly bonded together during semi-curing and subsequent final curing because the knit reinforcement is relatively open and allows excellent strike-through adhesion and the formation of the previously described integral columns 22 bonding the layers 15 and 16 together.

The strong bonding of the inner tube 15 and outer tube 16 during the semi-curing operation results in the hose 10 having improved oil resistance compared to previous types of hose having a layer of woven reinforcing fabric sandwiched between a base tube and a cover tube. Compared to said previous types of hose, the substantially unitary wall results in the hose 10 being less susceptible to pinhole type leaks which may occur if a foreign particle such as rust, grit, undispersed black, an air bubble, or the like, is present in the extruded base tube. It will also be appreciated that with the hose construction 10 being made of a substantially seamless inner or base tube 15, a seamless cover tube 16, and a uniform layer of knitted fabric reinforcement 20, it is easier to define the substantially uniform wall thickness throughout the convoluted section; and, with hose construction 10 being made of tubes 15–16 and layer 20 as described there is an elimination of what is commonly referred to as flat spotting on the inside diameter of the tip or hose end areas which frequently occurs in previously proposed hose constructions due to the character of construction in the overlap areas of the reinforcing fabric and other components. Flat spotting is undesirable because it may result in leakage in the clamping area due to the fact that it is difficult to obtain uniform clamping pressure.

The semi-curing as indicated by the block at 33 in FIG. 4 is preferably achieved utilizing steam under pressure; however, it will be appreciated that any suitable apparatus and technique may be employed to achieve such semi-curing including techniques of running substantially continuous lengths of uncured hose assembly through a temperature-controlled fluidized bed, or a suitable microwave curing tunnel, after which the hose is cut into specified lengths for the final molding operation.

The reinforcing layer 20 may be made of any suitable material including natural fibers, synthetic fibers including fiberglass, and metallic materials. In one application of this invention, a 2200 denier rayon material was employed in a lockstitch knitted pattern using 8 to 9 courses per inch.

The base tube 15 and cover tube 16 may be made of any suitable elastomeric material and the term elastomeric used herein is intended to include natural and synthetic rubbers and similar materials having elastomeric properties of flexibility and stretchability. Such materials include natural rubber, rubber-like butadiene-styrene and butadiene-acrylonitrile copolymers, neoprene, other rubber-like butadiene polymers and copolymers, copolymers and terpolymers based on ethylene and propylene, and the like. Vulcanizable rubbers are compounded so that they may be cured or vulcanized under heat using sulfur or other known agents, depending upon the specific material.

The semi-curing described above is preferably achieved in a controlled temperature environment and in the particular example considered, employed steam at 275° F and the semi-curing was carried out for roughly 10 minutes. The final curing was carried out employing internal steam at a temperature generally of the order of 335° F while exerting an internal pressure generally of the order of 100 PSIG with the outer surfaces in contact with a steel mold at a temperature of approximately 315° F and final curing was achieved in a time period of approximately 10 minutes.

The gauge or thickness of the base tube or layer 15 and of the cover tube or outer layer 16 will vary depending upon the end application of the hose 10. In the application of the invention where 2200 denier rayon is employed as a reinforcing layer 20 in a lockstitch knitted pattern of 8-9 courses per inch, the inner layer had a thickness of 0.100-0.105 inch while the outer layer had a thickness such that the total thickness of layers 15, 20, and 16 ranged between 0.170-0.175 inch.

Reference has been made throughout this disclosure that the improved hose construction of this invention is made possible due to the utilization of semi-cured elastomeric layers. It must be emphasized that with the assembly as disclosed herein, one purpose of semi-curing each assembly prior to the final molding operation is to limit flow of the material in the mold. That is important because without semi-curing it has been found that the uncured material will blow through the mold parting lines resulting in thin places in the hose wall; and, in extreme cases a hole often develops in the wall of the hose construction. An additional reason for semi-curing is the fact that sealing against internal steam pressure is easily accomplished by inserting tapered steam injection nozzles into the ends of the hose construction under a constant force, so that the wall of the hose construction is trapped between a sealing ring built into the wall of the mold and the tapered nozzle. Without semi-curing, the material in the hose wall would flow in the area of the sealing ring, and in many cases the wall would be cut completely through.

Semi-curing also limits the movement of material in the convoluted area of the mold during the final curing operation. Thus, semi-cured blanks or assemblies as defined at 33 in FIG. 4 tend to reproduce the convolutions of the mold on the inside of the hose construction more faithfully than would be the case with an uncured blank. This can be shown by comparing the wall thickness in the crests of the convolutions, with wall thickness in the valleys. With each of the previously proposed hose constructions which do not appear to be semi-cured, this ratio appears to be at least 1.5:1, that is the wall gauge at the crests is at least 50% greater than at the valleys. However, with the hose construction of this invention made using semi-cured blanks, the ratio is less than 1.25:1, that is the wall gauge at the peaks is no more than 25% greater than wall gauge in the valleys. In addition to providing an improved hose construction, the hose construction of this invention enables use of existing molds.

Quantitatively, the degree of semi-curing considered by this invention can be estimated by comparing semi-cured physical properties of a particular exemplary material or compound with those properties obtained by the material being fully cured and as follows:

|  | Semi-Cured Material | Fully Cured Material |
| --- | --- | --- |
| Hardness | 70 | 75 |
| 100% Modulus (psi) | 333 | 618 |
| 200% Modulus (psi) | 533 | 1030 |
| -continued |  |  |
| Tensile Strength (psi) | 733 | 1195 |
| Elongation (%) | 443 | 258 |

In terms of 100% modulus, the semi-cured material achieves 54% of the fully cured result. Thus the term "semi-cured" is quite accurate as used in this disclosure, at least when degree of cure is expressed in terms of this parameter.

The terms "curing" and "semi-curing" have been used herein as they relate to molded hose constructions in accordance with this invention. In general, it is preferable to make the hose construction of this invention using a "vulcanizable rubber." The term "vulcanizable rubber" indicates an elastomeric material which has chemically active sites present on, or associated with, the long chain molecules which provide the physical basis for the unique behavior of this class of materials.

The action of vulcanization or curing means the reaction of these chemically active sites either with each other, or more generally with an added polyfunctional vulcanizing or curing agent. The vulcanizing or curing reaction is usually triggered by an input of energy, generally in the form of heat, but other forms of energy such as ultra violet radiation or electron beam radiation can be used.

The physical result of vulcanization or curing is to tie the individual long chain molecules together at various points along their length by cross links consisting of chemical bonds. Before cure, individual molecules in the mass are free to slip past one another, that is the uncured elastomer may flow and it exhibits little or no elastic memory. After curing the individual molecules are tied to one another and flow becomes impossible - in effect the whole mass may be considered as becoming a single giant molecule. The cured elastomer may still be deformed, but after removal of the force producing deformation, the material will attempt to recover its original shape, that is, it exhibits pronounced elastic memory.

The number of cross links formed during the curing reaction depends on many things, including reactivity of the elastomer, reactivity of the curing agent, time of reaction, and temperature or intensity of other energy source. As the number of cross links increases, however, properties of the material change in a way that reflects the fact that movement of one long chain molecule relative to another becomes progressively more limited. Thus hardness, modulus, elastic memory and tensile strength increase with increasing level of cure (modulus may be considered as resistance to deformation).

The "ultimate" state of cure (level of cross-linking) is not a unique state. In technological terms, "ultimate cure" corresponds to some desired set of physical properties. This level of cure may be reached in a single curing step, or it may be found convenient to break it down into two (or more) curing steps. In the case where curing is achieved in two separate steps, as disclosed by this invention, the material is said to be semi-cured after completion of the first curing step and before commencement of the second.

In carrying the various method steps illustrated in FIG. 4, it will be appreciated that various apparatus may be required and it is to be understood that such apparatus are of the type well known in the art.

While present exemplary embodiments of this invention, and method of practicing the same, have been illustrated and described, it is to be understood that this invention may be otherwise various embodied and practiced within the scope of the following claims.

What is claimed is:

1. A method for making a flexible hose having axially spaced convolutions defining alternating crests and troughs, comprising the steps of:
   (a) forming a base tube of elastomeric material;
   (b) knitting single reinforcing layer of 2200 denier rayon filament in a knitted lockstitch of 8–9 courses per inch around said base tube, said layer having open spaces therein;
   (c) applying a cover tube of elastomeric material free of adhesive means concentrically around said layer and base tube to define a tubular assembly;
   (d) subjecting said assembly to semi-curing conditions to provide a semi-cure of said base and outer tubes;
   (e) placing said semi-cured assembly within a mold having axially spaced convoluted walls;
   (f) final forming and final curing said semi-cured assembly within said mold by urging said assembly against said wall in a controlled environment to form axially sapced convolutions in said hose having crests and troughs of roughly uniform wall thickness such that the thickness at said crests is no more than 25% greater than the thickness at said troughs;
   (g) the 100% modulus of said semi-cured elastomeric material being roughly fifty percent less than the 100% modulus of said final cured tubes;
   (h) bonding together the elements of said assembly into a unitary structure and causing strikethrough columns of elastomeric material between said tubes through the open spaces of said reinforcing layer; and
   (i) coiling a metal reinforcing member to a configuration corresponding to helical convolutions of said hose and inserting said reinforcing member so that it is supported within surfaces thereof arranged opposite the crests of the hose convolutions.

2. The method of claim 1 wherein said mold has axially spaced helical convolutions so that helical convolutions are formed in said hose during said final curing and said metal reinformcing member is made of spring steel.

3. A method as set forth in claim 1 in which said step of forming a base tube comprises forming said base tube by extrusion process, said step of applying a reinforcing layer comprises knitting a reinforcing layer concentrically around said base tube while supporting said base tube against collapse, and said step of applying a cover tube comprises extruding a cover tube concentrically around said knitted reinforcing layer.

4. A method as set forth in claim 3 in which said step of applying a reinforcing layer is achieved while supporting said base tube utilizing a pressurized fluid.

5. A method as set forth in claim 4 in which said step of applying a cover tube comprises extruding a seamless cover tube concentrically around said knitted reinforcing layer.

6. A method as set forth in claim 5 in which said semi-curing step is achieved at a temperature of approximately 275° F for a time period of approximately 10 minutes and said final forming and final curing step is achieved using internal steam at a temperature of approximately 335° F for a time period of approximately 10 minutes, during which time the outside of said assembly is in contact with said wall of said mold which is heated to approximately 315° F.

* * * * *